United States Patent
Kim et al.

(10) Patent No.: US 8,027,705 B2
(45) Date of Patent: Sep. 27, 2011

(54) METHOD AND APPARATUS FOR PROVIDING INFORMATION DURING A CALL AND A MOBILE DEVICE INCLUDING THE SAME

(75) Inventors: Sang-youn Kim, Seoul (KR);
Gyung-hye Yang, Seoul (KR);
Byung-seok Soh, Suwon-si (KR);
Yong-beom Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 767 days.

(21) Appl. No.: 11/483,772

(22) Filed: Jul. 11, 2006

(65) Prior Publication Data
US 2007/0072601 A1    Mar. 29, 2007

(30) Foreign Application Priority Data
Jul. 29, 2005 (KR) .................. 10-2005-0069761

(51) Int. Cl.
*H04B 3/36* (2006.01)
(52) U.S. Cl. ............... 455/567; 340/7.6; 340/407.1
(58) Field of Classification Search ......... 455/404.1, 455/412.2, 567; 340/7.6, 407.1
See application file for complete search history.

(56) References Cited

U.S. PATENT DOCUMENTS

| | | | |
|---|---|---|---|
| 5,719,561 A * | 2/1998 | Gonzales | 340/7.51 |
| 5,754,096 A * | 5/1998 | Muto et al. | 340/407.1 |
| 6,160,489 A * | 12/2000 | Perry et al. | 340/7.6 |
| 6,359,550 B1 * | 3/2002 | Brisebois et al. | 340/407.1 |
| 6,653,930 B1 | 11/2003 | Bonomo et al. | |
| 6,850,150 B1 * | 2/2005 | Ronkainen | 340/7.58 |
| 6,879,848 B2 * | 4/2005 | Lygas | 455/567 |
| 6,954,657 B2 * | 10/2005 | Bork et al. | 455/567 |
| 6,963,762 B2 * | 11/2005 | Kaaresoja et al. | 455/567 |
| 7,085,585 B2 * | 8/2006 | Camarillo et al. | 455/550.1 |
| 7,136,482 B2 * | 11/2006 | Wille | 379/373.02 |
| 7,136,894 B2 * | 11/2006 | Britt, Jr. | 709/201 |
| 7,148,789 B2 * | 12/2006 | Sadler et al. | 340/407.1 |
| 7,212,835 B2 * | 5/2007 | Mantyjarvi et al. | 455/550.1 |
| 7,336,977 B2 * | 2/2008 | Katayanagi | 455/567 |
| 7,439,872 B2 * | 10/2008 | Hiltunen | 340/691.1 |
| 2004/0204152 A1 * | 10/2004 | Chang et al. | 455/567 |
| 2006/0234768 A1 * | 10/2006 | Goris et al. | 455/556.1 |
| 2006/0248183 A1 * | 11/2006 | Barton | 709/224 |
| 2010/0302003 A1 * | 12/2010 | Zellner | 340/7.6 |

* cited by examiner

*Primary Examiner* — Lester Kincaid
*Assistant Examiner* — Steven Kelley
(74) *Attorney, Agent, or Firm* — Staas & Halsey LLP

(57) ABSTRACT

An apparatus and a method for providing information during a call by delivering the current state and changes of state of a mobile device by tactile information, and which does not interfere with the phone conversation. The apparatus for providing information during a call comprises an information-sensing unit sensing at least one among information about the state of a mobile device and the state of a phone conversation, an information-analysis unit analyzing the sensed state information, a tactile information-generating unit generating tactile information corresponding to the sensed information, which was analyzed by the information-analysis unit, a tactile information-outputting unit delivering the tactile information to a user, and a driving unit generating a driving signal which drives the tactile information-outputting unit by converting the tactile information.

39 Claims, 9 Drawing Sheets

FIG. 6
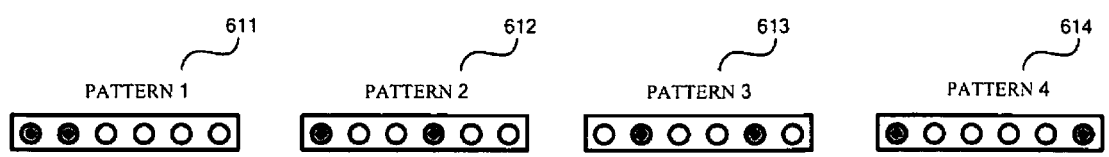
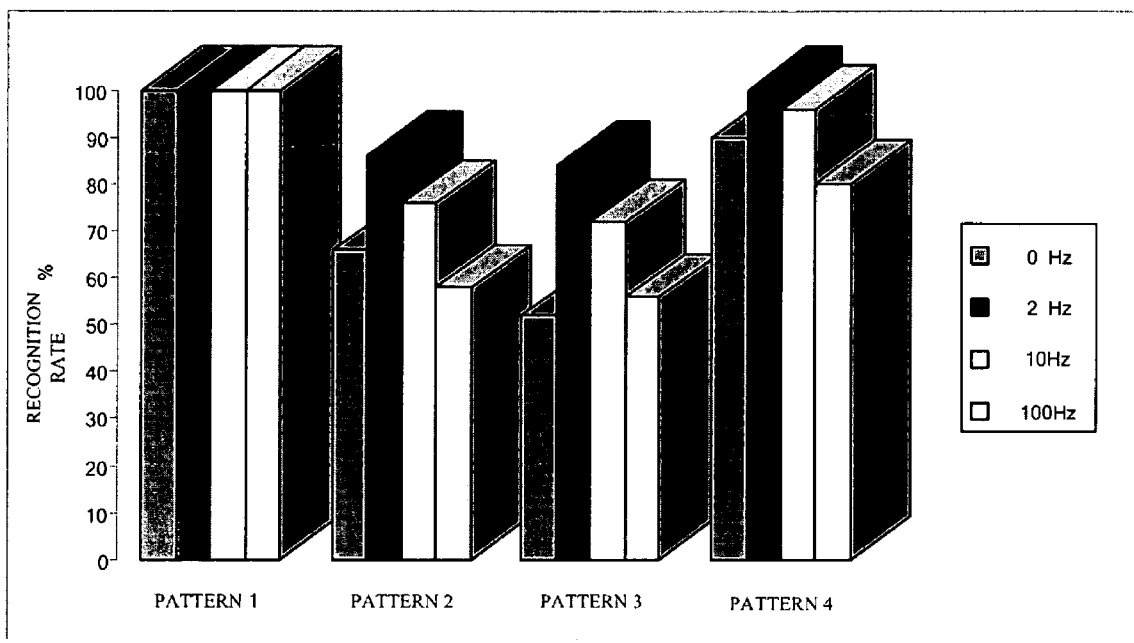

FIG. 8
(a)
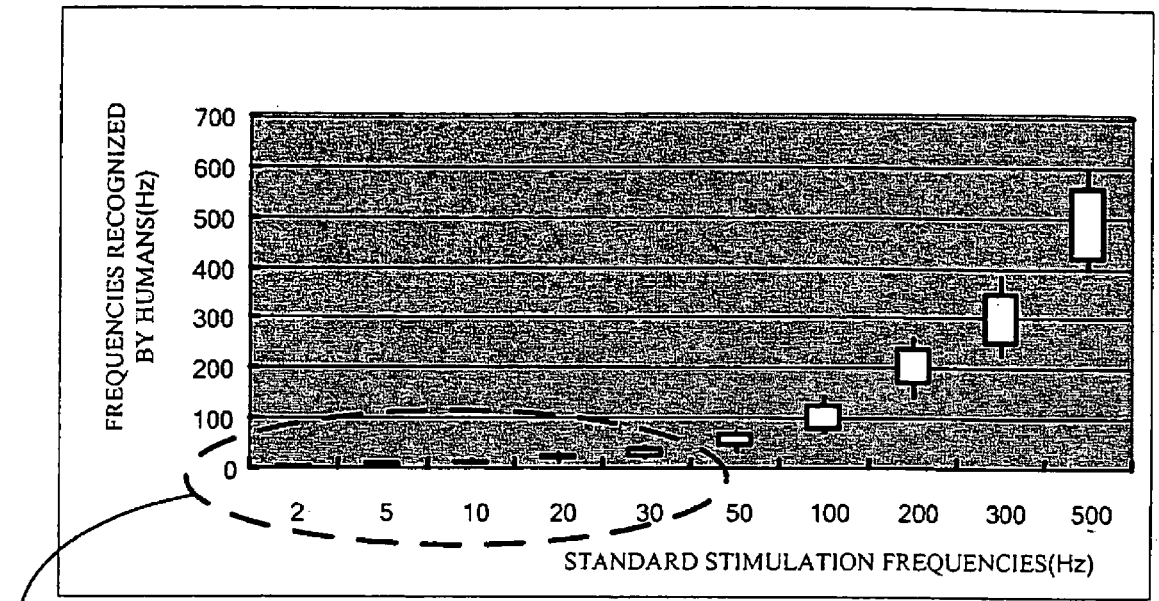
(b)
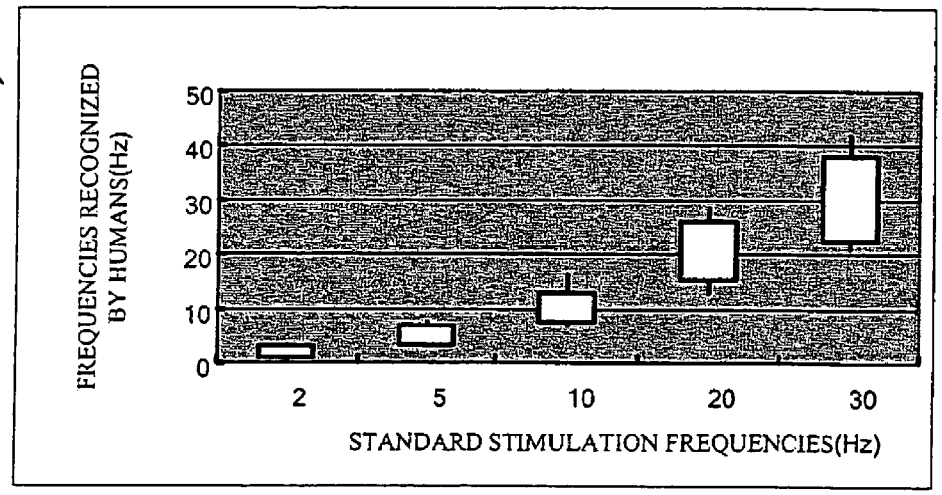

METHOD AND APPARATUS FOR PROVIDING INFORMATION DURING A CALL AND A MOBILE DEVICE INCLUDING THE SAME

CROSS-REFERENCE TO RELATED APPLICATIONS

This application is based on and claims priority from Korean Patent Application No. 10-2005-0069761 filed on Jul. 29, 2005, the disclosure of which is incorporated herein in its entirety by reference.

BACKGROUND OF THE INVENTION

1. Field of the Invention

The present invention relates to providing information during a call. More particularly, the present invention relates to an apparatus and a method for providing information during a call, which helps ease conversation by delivering the current state of a mobile device and the change of the state in a tactile manner that does not interfere with the conversation.

2. Description of the Related Art

Generally, changes of the state of a mobile device produced by events such as another call, arrival of a message, etc. occasionally occur during a call. Several methods for sensing a change of the state of a mobile device during a call have been provided, and a representative method among them is to inform a user of such information by sound or vibration. U.S. Pat. No. 6,653,930 presents a method for informing a user of the arrival of an urgent message during a call by a vibration that is different from a call in a normal mode.

However, a problem occurs when a user is notified of a change of state of a mobile device by sound or vibration, which can disturb the conversation.

SUMMARY OF THE INVENTION

An aspect of the present invention is to provide an apparatus and a method to inform a user of information about the state of a mobile device or the state of a conversation, which is sensed during a call using a mobile device, without interfering with the conversation.

Another aspect of the present invention is to provide a method and an apparatus to provide information about the state of a mobile device or the state of a conversation, which is sensed during a call, by tactile information so that a user can easily recognize and differentiate the information.

The present invention will not be limited to the technical aspects described above. Other aspects not described herein will be more clearly understood by those in the art from the following detailed description.

According to an exemplary embodiment of the present invention, there is provided an apparatus for providing information during a call, comprising an information-sensing unit sensing at least one of information about the state of a mobile device and the state of a conversation during a call; an information-analysis unit analyzing the sensed information about the state of the mobile device or the state of the conversation; a tactile information-generating unit generating tactile information corresponding to the sensed information about the state of the mobile device or the state of the conversation, which were analyzed by the information-analysis unit; a tactile information-outputting unit delivering tactile information to a user; and a driving unit generating a driving signal which drives the tactile information-outputting unit by converting tactile information.

According to an exemplary embodiment of the present invention, there is provided a mobile device having an apparatus providing information during a call, comprising a transceiver transmitting and receiving radio signals; an input unit where voice or texts are input by a user; an output unit where the voice, which is transmitted from the transceiver, or the text, which is input by the input unit, are output; an information-sensing unit sensing at least one of information about the state of a mobile device or the state of the conversation during a call; an information-analysis unit analyzing the sensed information about the state of the mobile device or the state of the conversation; a tactile information-generating unit generating tactile information corresponding to information about the state of the mobile device or the state of the conversation, which were analyzed by the information-analysis unit; a tactile information-outputting unit delivering tactile information to a user; a driving unit generating a driving signal which drives the tactile information-outputting unit by converting tactile information; and a control unit transmitting the state of a mobile device or the state of the conversation to the information-sensing unit.

According to an exemplary embodiment of the present invention, there is provided a method for providing information during a call, comprising sensing at least one of information about the state of a mobile device or the state of the conversation during a call; analyzing the sensed information about the state of the mobile device or the state of the conversation; generating tactile information corresponding to information about the state of the mobile device or the state of the conversation, which were analyzed by the information-analysis unit; generating a driving signal that drives a contactor which transmits tactile information to a user by converting tactile information; and transmitting tactile information to a user by driving the contactor according to the driving signal.

Additional aspects and/or advantages of the invention will be set forth in part in the description which follows and, in part, will be apparent from the description, or may be learned by practice of the invention.

BRIEF DESCRIPTION OF THE DRAWINGS

The above aspects and other features and advantages of the present invention will become more apparent by describing in detail exemplary embodiments thereof with reference to the attached drawings in which:

FIG. 6 illustrates how the recognition rate of some driving patterns of the one-dimensional tactile device is changed according to frequency;

FIG. 8 is a graph illustrating a distribution of frequencies that can be clearly distinguished from frequencies of a standard stimulation;

DETAILED DESCRIPTION OF THE PREFERRED EMBODIMENTS

Figure 1:
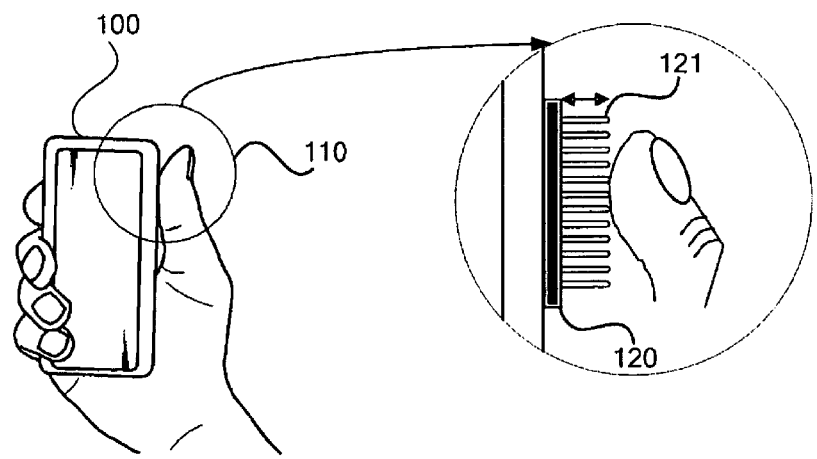
FIG. 1 illustrates a mobile device having an apparatus for providing information during a call according to an exemplary embodiment of the present invention.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the present invention will be described in more detail with reference to the accompanying drawings. Each block and combinations of the blocks of the flowcharts can be executed by computer program instructions. As the computer program instructions can be executed in the processor of a general-purpose computer, special-purpose computer or other programmable data processing equipment, the instructions executed via the computers or other programmable data processing equipment generate a means for executing the functions explained in the flowchart blocks. As it is possible for the computer program instructions to be saved in computer-usable or computer-readable memories in order to implement functions in certain ways, the instructions saved in the computer-usable or computer-readable memories can produce items containing the instruction means for performing the functions explained in the flow chart blocks.

Also, each block can represent a part of a module, or a segment of code that includes one or more executable instructions for executing specific logical functions. Further, it should be noted that functions mentioned in the blocks can be executed out of order. For example, two sequential blocks can be executed at the same time, and the blocks can be executed in reverse order according to the concerned functions.

FIG. 1 illustrates a mobile device 100 including an apparatus for providing information during a call according to an exemplary embodiment of the present invention. Hereinafter, exemplary embodiments of the present invention will be described, centering on a mobile phone, as an exemplary embodiment of a mobile device having an apparatus for providing information during a call. However this is only for explanatory purposes, and the present invention should not be construed as being limited to the exemplary embodiments. In addition, various radio communication terminals having a calling function, such as a PDA, can embody the invention.

As illustrated in FIG. 1, the mobile device 100 includes a tactile device 120 where a thumb contacts the device and provides the sensed information during a call through the tactile device 120. For example, when there is another call, a message is received, a battery dies, or the reception becomes weak during a call, the tactile device 120 transmits information about the state of the mobile device to the user by driving a contactor 121 with a different pattern, or with a different frequency.

The mobile device 100 according to an exemplary embodiment can attract the attention of a user by positioning the tactile device 120 at a section 110 where a thumb contacts the device 100. The user can receive various information during a call, and the mobile device 100 can transmit various tactile stimuli appropriately, which makes information transmission more effective.

Figure 2:
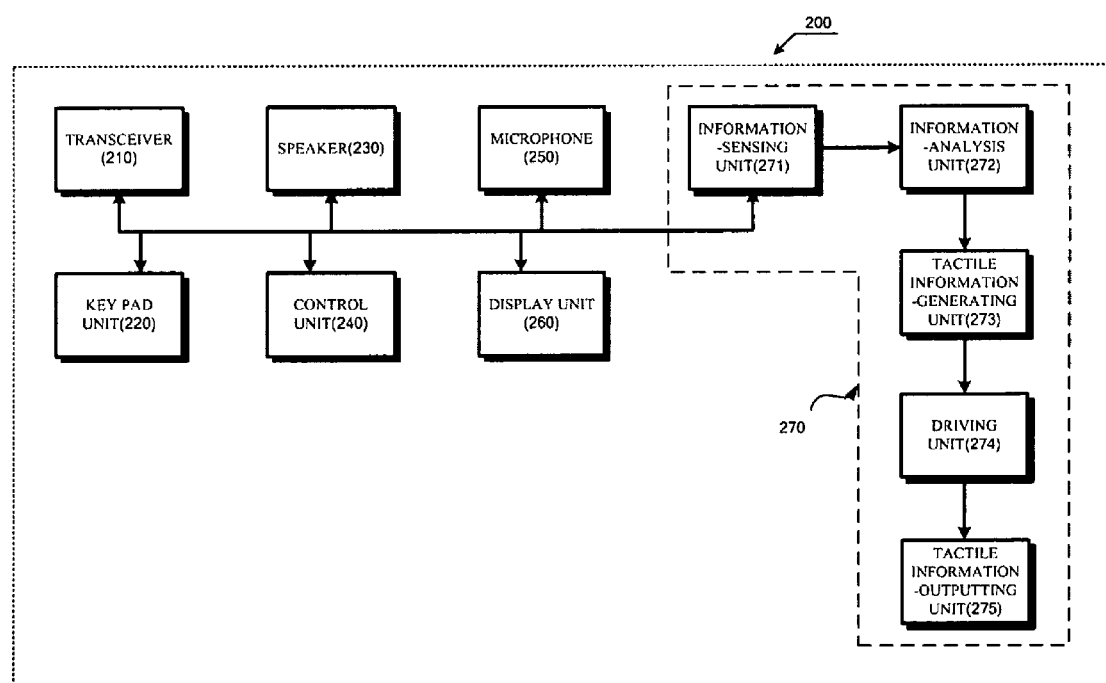
FIG. 2 is a block diagram illustrating the structure of a mobile device having an apparatus for providing information during a call according to an exemplary embodiment of the present invention.

FIG. 2 is a block diagram illustrating the structure of a mobile device having an apparatus for providing information during a call according to an exemplary embodiment of the present invention.

A mobile device including an apparatus for providing information during a call according to an exemplary embodiment of the present invention can include a transceiver 210, a keypad unit 220, a speaker 230, a control unit 240, a microphone 250, a display unit 260, and an information-providing device 270.

The transceiver 210 receives radio signals, or converts audio and multimedia data into radio signals and then transmits the signals. While it is not described in the accompanying drawings, the transceiver 210 can include a power unit for supplying necessary power for the operation of each part of a communication terminal. A user inputs data via the keypad unit 220, and the speaker 230 outputs voice signals delivered from the transceiver 210 or various audio information of the mobile device. The microphone 250 is used to input the voice of a user during conversation, and the display unit 260 provides visual information to a user. The control unit 240 controls the operation of the transceiver 210, the keypad unit 220, the speaker 230, the microphone 250, the display unit 260 and the information-providing device 270 so that the control unit can support functions, such as control of communications or radio frequencies, control of communication protocols, conversion of audio signals, SMS (Short Message Service), and voice transmission.

The information-providing device 270 can be further divided into an information-sensing unit 271, an information-analysis unit 272, a tactile information-generating unit 273, a driving unit 274, and a tactile information output unit 275.

The information-sensing unit 271 senses information about another call, the arrival of a message, the remaining level of a battery, the state of a received radio wave, etc. during a call, and transmits the information to the information-analysis unit 272. The information-analysis unit 272 analyzes the information sensed by the information-sensing unit 271.

The tactile information-generating unit 273 maps a pattern to drive the tactile information-outputting unit 275 to each set of sensed information according to the kinds of sensed information of the state of the mobile device during a call, which is recognized by the information-analysis unit 272, and selects a frequency to drive the tactile information-outputting unit 275 according to a selected pattern. Therefore, the tactile information-generating unit 273 can be further divided into a pattern-mapping unit (not shown), which maps the driving pattern of the tactile information-outputting unit 275 to the state information of a mobile device or the state information of a conversation, and a frequency-decision unit (not shown), which decides the driving frequency where the tactile information-outputting unit 275 is driven according the driving pattern. The patterns and frequencies, which will drive the tactile information-outputting unit 275 according to the kinds of sensed information, will be described later by referring to FIGS. 4 to 10.

The driving unit 274 converts the tactile information having patterns and frequencies generated by the tactile information-generating unit 273 into driving signals to drive the tactile-information-outputting unit 275. The tactile information-outputting unit 275 drives the part that a user contacts using driving signals. The tactile information-outputting unit 275 can be a tactile device having a contactor 121 delivering tactile stimuli physically.

Each element in FIG. 2 can refer to a hardware element such as an FPGA (Field Programmable Gate Array) or an ASIC (Application-Specific Integrated Circuit), but the elements are not limited to software or hardware. The elements can reside in an addressable storage media or can be reproduced in one or more processors. The functions provided in the elements can be implemented by further-divided elements, or can be implemented to execute certain functions by combining plural elements. Furthermore, the elements can be implemented to execute one or more computers within a system.

Figure 3:
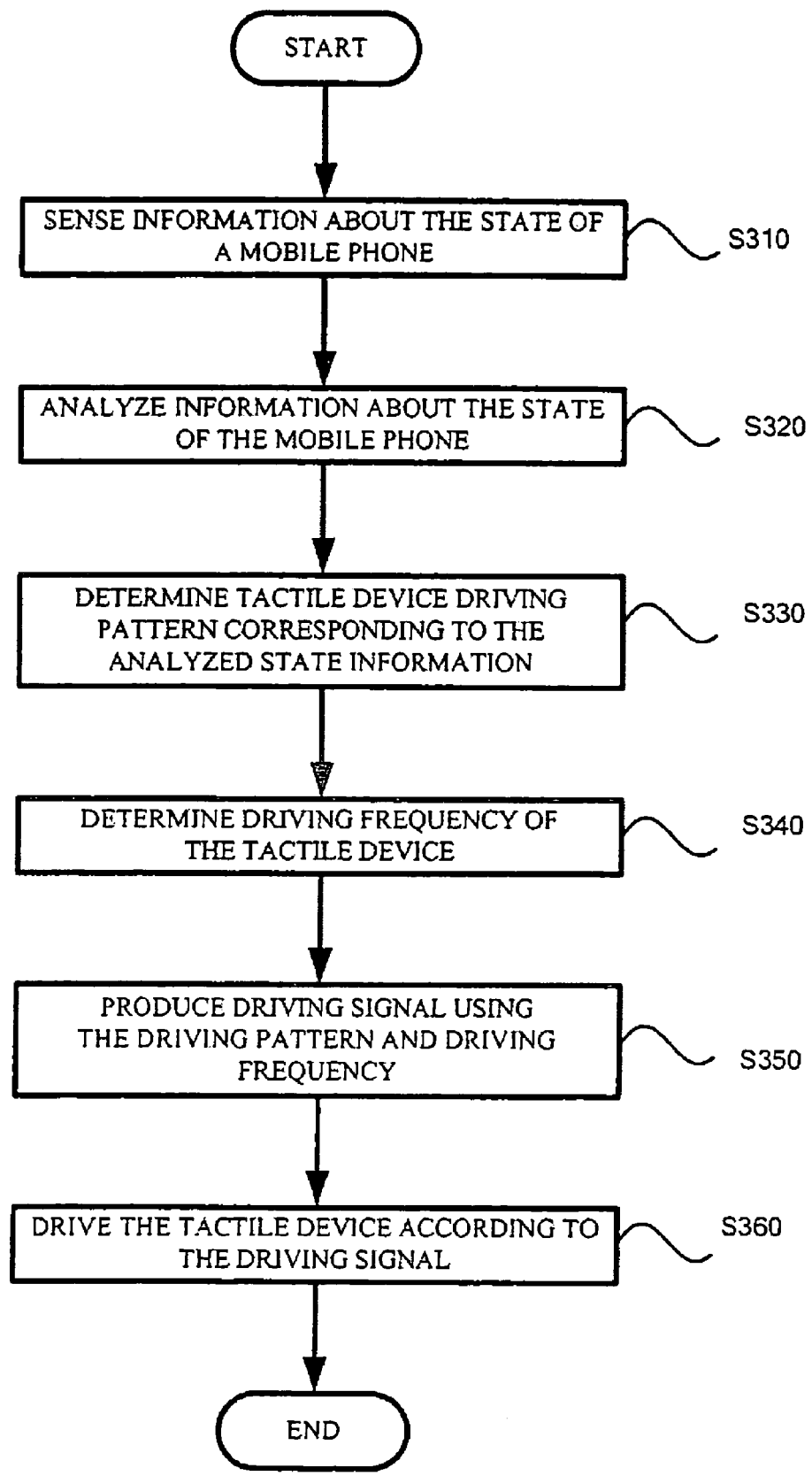
FIG. 3 is a flow chart illustrating the process of providing information through a tactile device during a call according to an exemplary embodiment of the present invention.

FIG. 3 is a flowchart illustrating the process for providing information through a tactile device during a call according to an exemplary embodiment of the present invention.

A mobile device 200 senses information about the state of the mobile device such as another call coming in, arrival of a message, the battery level, the state of a received radio wave, etc. during a call, or information about the state of a conversation such as a standby state during a call, the connection, etc. S310. When a change of state of the mobile device or the conversation is sensed, the state information is analyzed S320. After the information is analyzed, tactile information corresponding to the analyzed information is generated S330 and S340. The tactile information refers to information about tactile stimuli to be transmitted to a user through a tactile device, and includes a pattern and frequency to drive the tactile device.

When the driving pattern and the driving frequency of the tactile device are decided, a driving signal to physically drive the tactile device is produced S350, and the tactile device is driven according to the driving signal S360. Generally, the process of producing the driving signal can also involve amplifying the signal.

Figure 4:
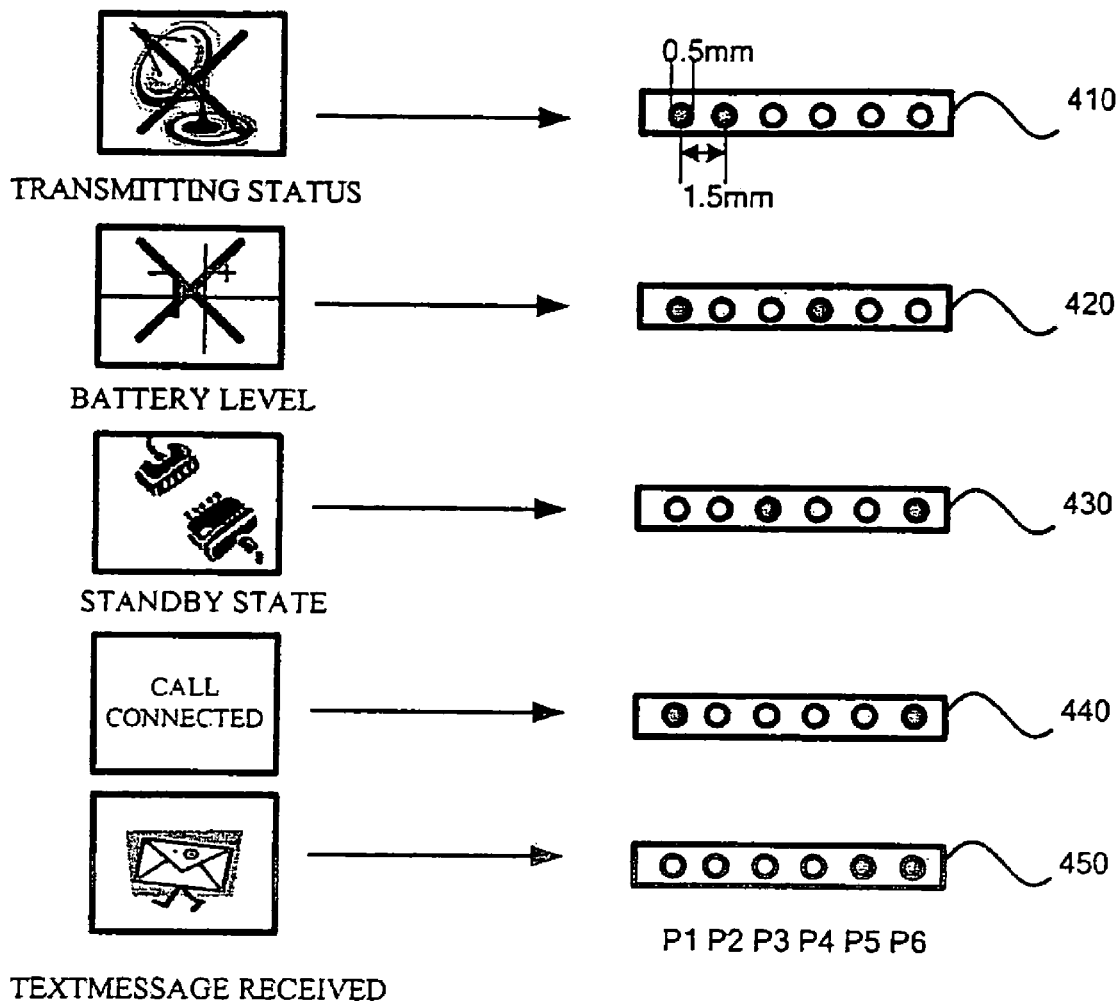
FIG. 4 illustrates an exemplary embodiment of a device for providing information during a call by driving a one-dimensional tactile device with different patterns according to the provided information.

FIG. 4 illustrates an exemplary embodiment of a device for providing information during a call, which involves driving a one-dimensional tactile device with different patterns according to the provided information.

The one-dimensional tactile device has a contactor 121 where pins of 0.5 mm thick are arranged at intervals of 1.5 mm along one row. Different tactile stimuli are delivered to a user by moving pins of the contactor with different patterns according to the type of sensed information. For example, if P1 and P2, which are pins of the contactor 121, are raised 410, it means that the transmission state is not good, and if P1 and P4 are raised 420, it means that the battery is running out. If P3 and P6 are raised 430, it means the standby state is active during a call, and if P1 and P6 are raised 440, it means that a call was connected. If P5 and P6 are raised 450, it means that a text message has been received. The pins that are darkened in FIGS. 4 to 7 indicate that the pins are raised.

Figure 5:
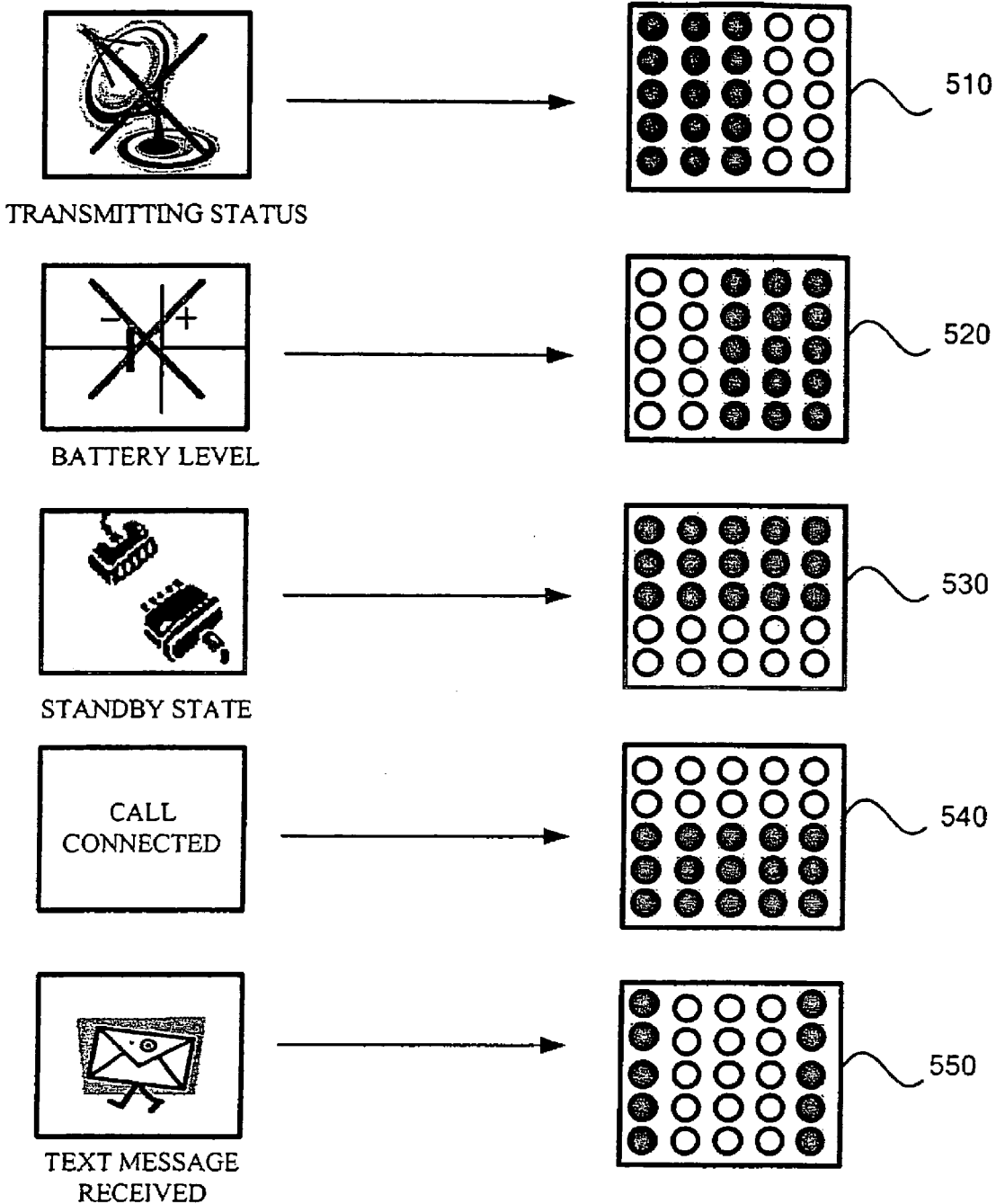
FIG. 5 illustrates another exemplary embodiment of a device for providing information during a call by driving a two-dimensional tactile device with different patterns according to the provided information.

FIG. 5 illustrates another exemplary embodiment of a device for providing information during a call, which involves driving a two-dimensional tactile device 120 with different patterns according to the provided information.

The tactile device in FIG. 5 has a contactor 121 where pins are arranged in a two-dimensional arrangement in rows and columns. Different information can be delivered to a user by driving the contactor 121 of the tactile device according to the type of state information sensed during a call 510-550. The two-dimensional tactile device has the advantage that it is easier for a user to discriminate each pattern than when using the one-dimensional tactile device.

If a tactile device is driven by raising or lowering pins according to the above-stated patterns, discriminating each pattern may not be easy. Especially in the case of the one-dimensional tactile device, if the interval between pins is not wide enough, a user may not be able to distinguish each pattern and may become confused. Therefore, rather than giving static stimuli like raised letters, if the contactor 121 is driven at a certain frequency, discrimination success rate improves.

FIG. 6 illustrates how the recognition rate of some driving patterns of the one-dimensional tactile device changes according to frequency.

The graph in FIG. 6 shows how well a user recognized the pattern when the user received a four tactile stimulation patterns (patterns 1-4) of the one-dimensional tactile device. The x-axis of the graph indicates types of patterns, and the y-axis indicates the recognition rate. The graph in FIG. 6 shows the result when the 4 tactile stimuli patterns 611-614 were applied at frequencies of 0, 2, 10 and 100 Hz.

When the pattern 1 611 was applied, 100% of users recognized it as pattern 1 for all frequencies. When the pattern 2 612 was applied, 66% of users recognized it at 0 Hz, 86% of users recognized it at 2 Hz, 76% of users recognized it at 10 Hz, and 58% of users recognized it at 100 Hz. The recognition rate pattern 2 was highest when it was applied at 2 Hz (a low frequency). For patterns 3 and 4, the recognition rate was highest when a low frequency of 2 Hz was used. In other words, the tactile stimulation, which raises a contactor such as raised letters, lowers the recognition rate of patterns to a significant level. A user's discrimination success rate at low frequencies such as 2 or 10 Hz is higher than that at the high frequency of 100 Hz.

Figure 7:
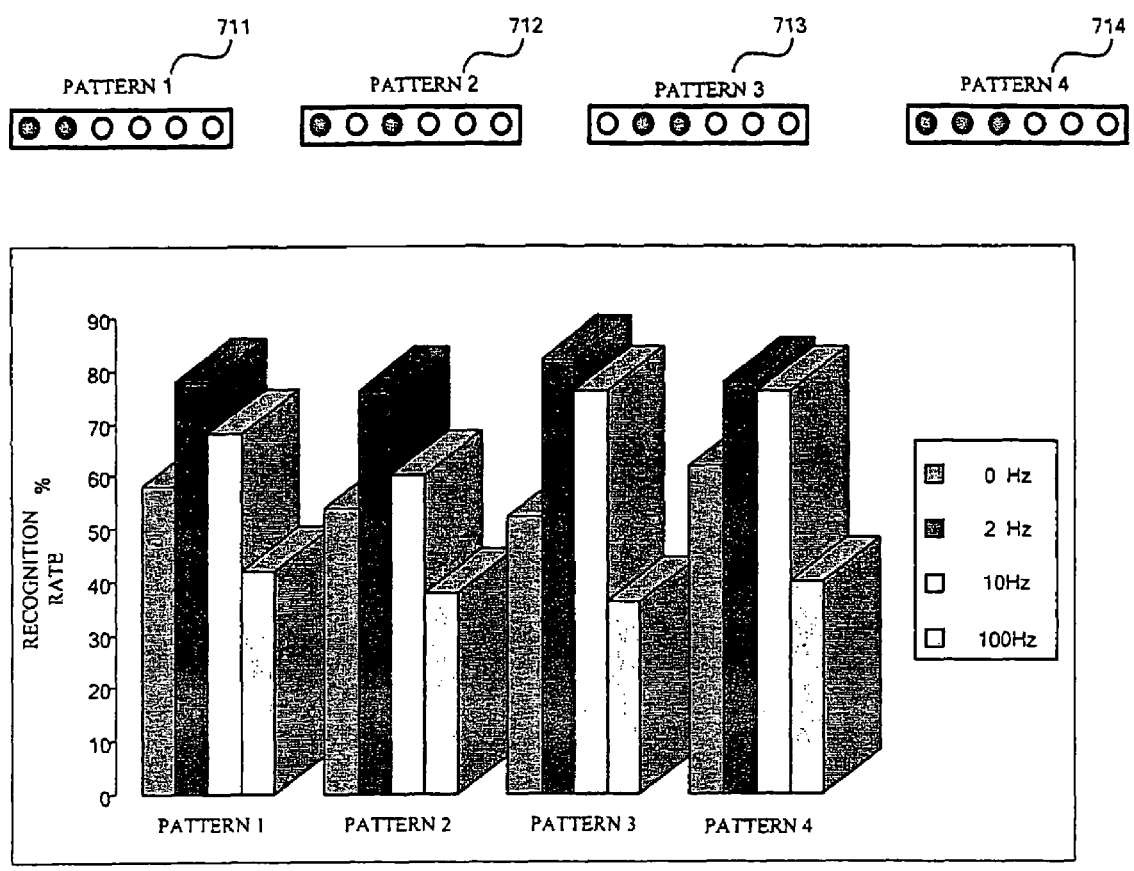
FIG. 7 illustrates how the recognition rate of other driving patterns of the one-dimensional tactile device is changed according to frequency.

FIG. 7 illustrates how the recognition rate of other driving patterns 711-714 of the one-dimensional tactile device changes according to frequency. FIG. 7 shows the recognition for each pattern when the tactile device was driven at frequencies of 0, 2, 10, and 100 Hz.

Patterns 1 to 4 in FIG. 7 illustrate the case where the intervals between driven pins are narrower than those of the patterns 1 to 4 in FIG. 6.

The graph in FIG. 7 shows that when the tactile stimulation for each pattern was provided at a rate of 2 Hz, the recognition rate was highest, and the second highest recognition rate occurred at 10 Hz. When the tactile stimuli were applied at 0 and 100 Hz, users became more confused than with other patterns. As shown from the experiments of FIG. 6 and FIG. 7, in the case of the one-dimensional tactile device, as the interval of driven pins becomes wider and the pins are driven at lower frequencies, the discrimination rate improves. Therefore, it is possible for information to be delivered by the tactile stimuli using clearly distinguishable frequencies.

FIG. 8 is a graph illustrating the distribution of frequencies that a user can clearly distinguish from frequencies of standard stimulation.

The graph (a) illustrates frequencies that a user recognizes when standard stimuli are applied at various frequencies. This experiment gives the standard tactile stimulation at different frequencies and then examines whether a user recognizes the two stimuli as the same stimulation.

As shown in FIG. 8A, if tactile stimulation is delivered at 500 Hz, the user recognizes it as a tactile stimulation at 400-550 Hz. If tactile stimulation is delivered at 300 Hz, the user recognizes it as tactile stimulation at 250 to 350 Hz. In case of a low frequency, as shown in FIG. 8B, if tactile stimulation is delivered at 2 Hz, the user recognizes it as almost 2 Hz, and for the standard stimulation of 5 Hz frequency, the user recognizes it as 4 to 6 Hz. For the standard stimulation of 10 Hz, the user recognizes it as 8 to 13 Hz, and for the standard stimulation of 20 Hz, the user recognizes it as 15 to 27 Hz. In other words, as the frequency of the tactile stimulation is lowered, the user is more likely to accurately recognize the stimulation, and as the frequency is raised, the user is more likely to recognize it as a stimulation of a different frequency. The results of this experiment show that the frequencies: 0, 1, 2, 4, 7, 12, 18, 44, 70, 100, 140, 190, and 255 Hz are readily distinguished by users. Therefore, if the tactile stimulation is delivered at one of these frequencies, the user can differentiate it from other tactile stimulations.

The set of acquired frequencies of the above-mentioned experiment can be expressed by the following equation:

$$H(x)=x \text{ (where } x \text{ is 0 or a real number not exceeding 2)}$$

$$H(x)=-0.00571x^4+0.32346x^3-1.52843x^2+2.75916x-0.01261 \text{ (where } x \text{ is a real number greater than 2)} \quad \text{Equation 1}$$

That is, a polynomial of degree 4. Further, the frequencies can also be represented by the following polynomial of degree 3.

$$H(x)=x \text{ (where } x \text{ is 0 or a real number not exceeding 2)}$$

$$H(x)=0.18648x^3-0.497x^2+0.24459x+0.95604 \text{ (where } x \text{ is a real number greater than 2)} \quad \text{Equation 2}$$

Figure 9:
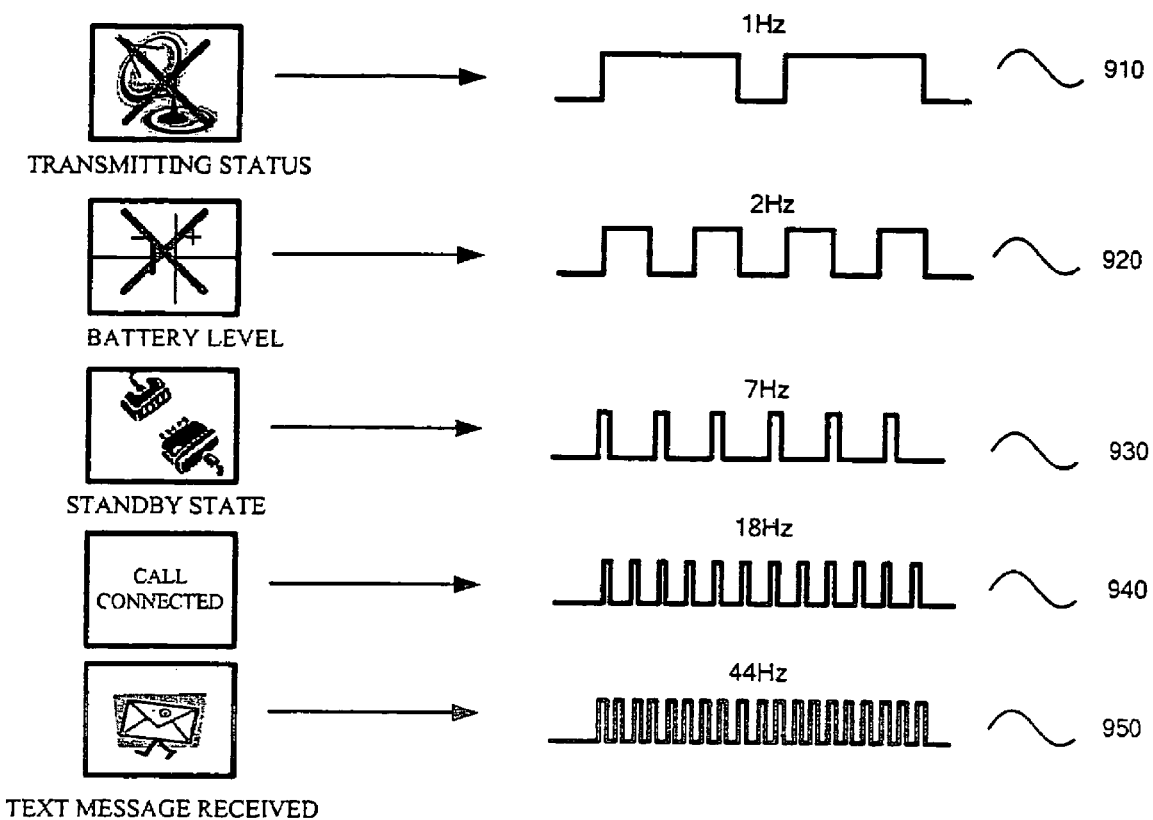
FIG. 9 illustrates an example where an information-providing device provides information with frequencies which can be easily distinguishable by a user according an embodiment of the present invention.

FIG. 9 illustrates an example in which an information-providing device provides information with frequencies which can be easily distinguished by a user according the embodiment of the present invention.

When plural sets of sensed information of the state of the device are delivered with tactile stimuli which can be easily distinguished by a user based on the above-described experiment in FIG. 8, the user can sense the different sets of state information. For example, as illustrated in FIG. 8, if the signal strength is weaker than a certain level, a 1 Hz tactile stimulation is delivered 910; if the battery is running out, a 2 Hz tactile stimulation is delivered 920; if the mode becomes the standby state during a call, a 7 Hz tactile stimulation is delivered 930; if a call is connected, an 18 Hz tactile stimulation is delivered 940; if a message is received during a call, a 44 Hz tactile stimulation is delivered 950. Here, the frequencies are from the set acquired by experiments on users.

When the sensed information of the state of the device is delivered using tactile stimuli at the low frequencies acquired by the above-described experiments, the pins of a contactor of a tactile device can be moved together, or only one or two pins can be moved.

In summary, in order to convey each set of state information, tactile patterns, different frequencies, or the combinations of patterns and frequencies can be used. If one set of state information can be various values, the various values can be distinguished by frequency, and each step of one set of state information can be distinguished by the driving patterns of the tactile device, and vice versa.

Figure 10:
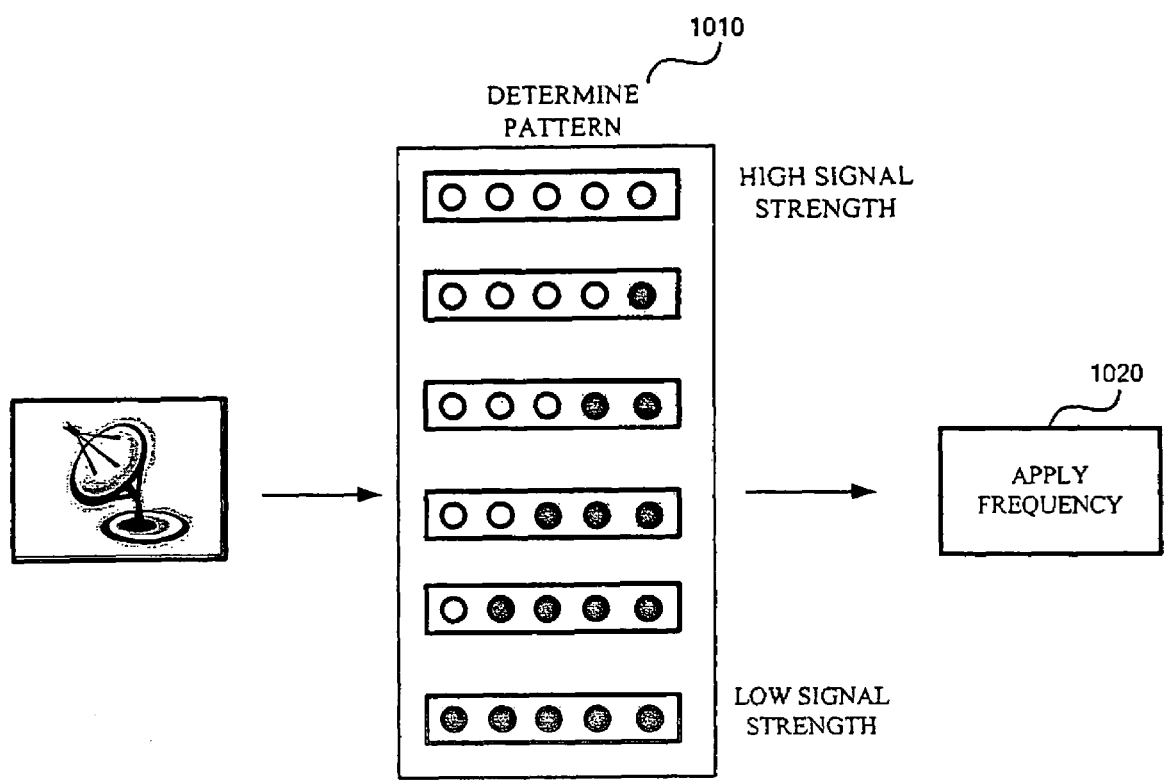
FIG. 10 illustrates an example in which each step is classified with combinations of patterns of tactile devices and frequencies when one set of state information is divided into several steps.

FIG. 10 illustrates an example in which each step is classified with combinations of tactile patterns and frequencies when one set of state information is divided into several steps.

The signal strength can be one of several values from a highest level to a lowest level. Therefore, by matching driving patterns of the tactile device for each signal strength level 1010, and providing tactile stimuli of the pattern with certain frequencies mapped to the signal strength 1020, the information about the changing state of electric waves can be continually delivered to the user.

The method and the apparatus for providing information during a call according the present invention produces the following effects.

First, various sensed information of the state of the device can be acquired without interfering with a phone conversation by delivering the state information of a mobile device or the information about the conversation sensed during a call by tactile stimulation.

Second, the efficiency of information transmission can be increased by delivering the information about the mobile device or the information about the conversation by tactile stimuli.

It will be understood by those of ordinary skill in the art that various replacements, modifications and changes may be made in the form and details without departing from the spirit and scope of the present invention as defined by the following claims. Therefore, it is to be appreciated that the above-described embodiments are for purposes of illustration only and are not to be construed as limitations of the invention.

What is claimed is:

1. An apparatus for providing information during a call, the apparatus comprising:
    an information-sensing unit sensing at least one of information about a state of a mobile device and a state of a conversation during the call;
    an information-analysis unit analyzing the sensed state information;
    a tactile information-generating unit generating tactile information corresponding to the state information, which was analyzed by the information-analysis unit;
    a tactile information-outputting unit delivering the tactile information to a user through tactile stimuli transmitted to the user through a contactor having individual contacting portions capable of physically contacting the user only when the tactile information is being delivered to the user; and
    a driving unit generating a driving signal which drives the tactile information-outputting unit by converting the tactile information,
    wherein the tactile information is transmitted in a selected pattern of the individual contacting portions based on a type of sensed information at a specific frequency according to a type of the selected pattern,
    the selected pattern is selected from a plurality of different patterns of the individual contacting portions, wherein the specific frequency of each of the plurality of different patterns is different from each of the specific frequencies of each of the other patterns, and
    each type of sensed state information is associated with one of the selected patterns and a specific frequency of transmitting the tactile information in the one selected pattern of the individual contacting portions.

2. The apparatus of claim 1, wherein the sensed information of the state of the mobile device refers to at least one of an arrival of a message, a battery level, a signal strength, and an amount of available memory.

3. The apparatus of claim 1, wherein the sensed information of the state of the phone conversation refers to at least one of information about the signal strength, information about another call received during a present call, information that a call was connected, and information about an arrival of a message.

4. The apparatus of claim 1, wherein the tactile information is information about the driving pattern of the tactile-information-outputting unit corresponding to the sensed information of state of the mobile device or the state of the phone conversation, and information about driving frequencies that drive the tactile information-outputting unit according to the driving patterns.

5. The apparatus of claim 4, wherein the driving frequencies are frequencies in which at least one driving pattern can be distinguished by a user when the driving frequencies are applied to the driving patterns.

6. The apparatus of claim 5, wherein the driving frequencies $H(x)$ are calculated according to $H(x)=ax$, where x is 0 or a real number not exceeding 2, and according to $H(x)=bx^4+cx^3+dx^2+ex+f$, where x is a real number greater than 2, and a, b, c, d, and f are constants.

7. The apparatus of claim 6, wherein 'a'=1, 'b'=−0.00571, 'c'=0.32346, 'd'=−1.52843, 'e'=2.75916, and 'f'=−0.01261.

8. The apparatus of claim 5, wherein the driving frequencies $H(x)$ are calculated according to $H(x)=ax$, where x is 0 or a real number not exceeding 2, and according to $H(x)=bx^3+cx^2+dx+e$, where x is a real number greater than 2, and a, b, c, and d are constants.

9. The apparatus of claim 8, wherein 'a'=1, 'b'=0.18648, 'c'=−0.497, 'd'=0.24459, and 'e'=0.95604.

10. The apparatus of claim 5, wherein the driving frequencies are one among 0 Hz, 1 Hz, 2 Hz, 4 Hz, 7 Hz, 12 Hz, 18 Hz, 44 Hz, 70 Hz, 100 Hz, 140 Hz, 190 Hz, and 255 Hz.

11. The apparatus of claim 5, wherein the driving frequencies are 10 Hz or less.

12. The apparatus of claim 1, wherein the driving frequencies refer to frequency in which the tactile information can be distinguishable from each other by a user.

13. The apparatus of claim 12, wherein the driving frequencies $H(x)$ are calculated according to $H(x)=ax$ where x is 0 or a real number greater than 2, and according to $H(x)=bx^4+cx^3+dx^2+ex+f$, where x is a real number greater than 2, and a, b, c, d, and f are constants.

14. The apparatus of claim 13, wherein 'a'=1, 'b'=−0.00571, 'c'=0.32346, 'd'=−1.52843, 'e'=2.75916, and 'f'=−0.01261.

15. The apparatus of claim 12, wherein the driving frequencies $H(x)$ are calculated according to $H(x)=ax$, where x is 0 or a real number not exceeding 2, and according to $H(x)=bx^3+cx^2+dx+e$, where x is a real number greater than 2, and a, b, c, and d are constants.

16. The apparatus of claim 15, wherein 'a'=1, 'b'=0.18648, 'c'=−0.497, 'd'=0.24459, and 'e'=0.95604.

17. The apparatus of claim 1, wherein the tactile information-generating unit includes a pattern-mapping unit that matches a driving pattern of the tactile information-outputting unit with the sensed information of the state of the mobile device or the state of the conversation and a frequency determination unit that determines the driving frequency at which the tactile information-outputting unit is driven according to the driving pattern.

18. The apparatus of claim 1, wherein the tactile information-outputting unit includes a contactor comprising several pins that are driven according to the tactile information.

19. A mobile device comprising:
a transceiver transmitting and receiving radio signals;
an input unit where voice or text are input by a user;
an output unit which outputs the radio signals that are transmitted from the transceiver, or the voice or the text, which is input by the input unit;
an information-sensing unit sensing at least one of information about a state of a mobile device or a state of a conversation during a call;
an information-analysis unit analyzing the sensed state information;
a tactile information-generating unit generating tactile information corresponding to the sensed state information, which was analyzed by the information-analysis unit;
a tactile information-outputting unit delivering tactile information to a user through tactile stimuli transmitted to the user through a contactor having individual contacting portions capable of physically contacting the user only when the tactile information is being delivered to the user;
a driving unit generating a driving signal which drives the tactile information- outputting unit by converting tactile information; and
a control unit transmitting the state of the mobile device or the state of the conversation to the information sensing unit,
wherein the tactile information is transmitted in a selected pattern of individual contacting portions based on a type of sensed information at a specific frequency according to a type of the selected pattern,
the selected pattern is selected from a plurality of different patterns of the individual contacting portions, wherein the specific frequency of each of the plurality of different patterns is different from each of the specific frequencies of each of the other patterns, and
each type of sensed state information is associated with one of the selected patterns and a specific frequency transmitting the tactile information in the one selected pattern of the individual contacting portions.

20. A method for providing information during a call, the method comprising:
sensing at least one of information about a state of a mobile device or a state of a phone conversation;
analyzing the sensed state information;
generating tactile information corresponding to the analyzed sensed state information;
generating a driving signal which drives a contactor having individual contacting portions capable of physically contacting a user to transmit tactile information to the user through tactile stimuli only when the tactile information is being delivered to the user, the tactile information being transmitted in a selected pattern of individual contacting portions based on a type of sensed information at a specific frequency according to a type of the pattern; and
transmitting the tactile information to a user by driving the contactor according to the driving signal,
wherein the selected pattern is selected from a plurality of different patterns of the individual contacting portions, and each type of sensed state information is associated with one of the selected patterns and a specific frequency of transmitting the tactile information in the one selected pattern of the individual contacting portions, and wherein the specific frequency of each of the plurality of different patterns is different from each of the specific frequencies of each of the other patterns.

21. The method of claim 20, wherein the sensed information of the state of the mobile device is at least one of information on an arrival of a message, information on a battery level, information on a strength of the received signal, or information on an amount of available memory.

22. The method of claim 20, wherein the sensed information of the state of the phone conversation is at least one of information about a signal strength, information about another call received during a current call, information detailing that a call was connected, or information on an arrival of a message.

23. The method of claim 20, wherein the tactile information refers to information about driving patterns output corresponding to the sensed information of the state of the mobile device or the state of the phone conversation, or information about driving frequencies which drive the tactile information-outputting unit according to the driving patterns.

24. The method of claim 23, wherein the driving frequencies refer to frequencies in which at least one driving pattern can be distinguished by a user when applied to the driving patterns.

25. The method of claim 24, wherein the driving frequencies $H(x)$ are calculated according to $H(x)=ax$, where x is 0 or a real number not exceeding 2, and according to $H(x)=bx^4+cx^3+dx^2+ex+f$, where x is a real number greater than 2, and a, b, c, d, and f are constants.

26. The method of claim 25, wherein 'a'=1, 'b'=−0.00571, 'c'=0.32346, 'd'=−1.52843, 'e'=2.75916, and 'f'=−0.01261.

27. The method of claim 24, wherein the driving frequencies $H(x)$ are calculated according to $H(x)=ax$, where x is 0 or a real number not exceeding 2, and according to $H(x)=bx^3+cx^2+dx+e$, where x is a real number greater than 2, and a, b, c, and d are constants.

28. The method of claim 27, wherein 'a'=1, 'b'=0.18648, 'c'=−0.497, 'd'=0.24459, and 'e'=0.95604.

29. The method of claim 24, wherein the driving frequencies are one among 0 Hz, 1 Hz, 2 Hz, 4 Hz, 7 Hz, 12 Hz, 18 Hz, 44 Hz, 70 Hz, 100 Hz, 140 Hz, 190 Hz, and 255 Hz.

30. The method of claim 24, wherein the driving frequencies are 10 Hz or less.

31. The method of claim 20, wherein the driving frequencies refer to frequencies in which the tactile information can be distinguished by a user.

32. The method of claim 31, wherein the driving frequencies $H(x)$ are calculated according to $H(x)=ax$, where x is 0 or a real number not exceeding 2, and according to $H(x)=bx^4+cx^3+dx^2+ex+f$, where x is a real number greater than 2, and a, b, c, d, and f are constants.

33. The method of claim 32, wherein 'a'=1, 'b'=−0.00571, 'c'=0.32346, 'd'=−1.52843, 'e'=2.75916, and 'f'=−0.01261.

34. The method of claim 31, wherein the driving frequencies $H(x)$ are calculated according to $H(x)=ax$, where x is 0 or a real number not exceeding 2, and according to $H(x)=bx^3+cx^2+dx+e$, where x is a real number greater than 2, and a, b, c, and d are constants.

35. The method of claim 34, wherein 'a'=1, 'b'=0.18648, 'c'=−0.497, 'd'=0.24459, and 'e'=0.95604.

36. The method of claim 20, wherein the tactile information generating comprises:

matching a driving pattern of the tactile information-outputting unit with the sensed information of the state of the mobile device or the state information of the conversation; and determining a driving frequency in which the tactile information-outputting unit is driven according to the driving pattern.

37. A recording medium that stores a computer-readable program that executes the method of claim 20.

38. An apparatus for providing information about at least one of a state of a mobile device and a state of a conversation, comprising:

an information-sensing unit sensing information about at least one of the state of the mobile device and the state of the conversation during a current call; and a tactile information-outputting unit transmitting tactile stimuli specific to the kinds of the sensed information to a user through a contactor having individual contacting portions physically contacting the user only when the tactile information is being delivered to the user, wherein the tactile information is transmitted in a selected pattern of individual contacting portions based on a type of sensed information at a specific frequency according to a type of the selected pattern, the selected pattern is selected from a plurality of different patterns of the individual contacting portions, wherein the specific frequency of each of the plurality of different patterns is different from each of the specific frequencies of each of the other patterns, and each type of sensed state information is associated with one of the selected patterns and a specific frequency of transmitting the tactile information in the one selected pattern of the individual contacting portions.

39. A method for providing information about at least one of a state of a mobile device and a state of a conversion, comprising:

sensing information about at least one of the state of the mobile device and the state of the conversation during a current call; and transmitting tactile stimuli specific to the kinds of the sensed information to a user through a contactor having individual contacting portions physically contacting the user only when the tactile information is being delivered to the user, wherein the tactile information is transmitted in a selected pattern of individual contacting portions based on a type of sensed information at a specific frequency according to a type of the selected pattern, the selected pattern is selected from a plurality of different patterns of the individual contacting portions, wherein the specific frequency of each of the plurality of different patterns is different from each of the specific frequencies of each of the other patterns, and each type of sensed state information is associated with one of the selected patterns and a specific frequency of transmitting the tactile information in the one selected pattern of the individual contacting portions.

* * * * *

UNITED STATES PATENT AND TRADEMARK OFFICE
CERTIFICATE OF CORRECTION

| | | |
|---|---|---|
| PATENT NO. | : 8,027,705 B2 | |
| APPLICATION NO. | : 11/483772 | |
| DATED | : September 27, 2011 | |
| INVENTOR(S) | : Kim et al. | |

It is certified that error appears in the above-identified patent and that said Letters Patent is hereby corrected as shown below:

Column 9, Line 8-9, In Claim 4, delete "tactile-information-outputting" and insert --tactile information-outputting--, therefor.

Column 10, Line 21, In Claim 19, delete "information- outputting" and insert --information-outputting--, therefor.

Column 12, Line 34 (Approx.), In Claim 39, delete "conversion," and insert --conversation,--, therefor.

Signed and Sealed this
Thirty-first Day of January, 2012

David J. Kappos
*Director of the United States Patent and Trademark Office*